Sept. 24, 1946.　　　C. G. TRIMBACH　　　2,408,354

ARRESTING GEAR

Filed March 28, 1936　　　3 Sheets-Sheet 1

INVENTOR.
CLEM G. TRIMBACH.
BY
ATTORNEY.

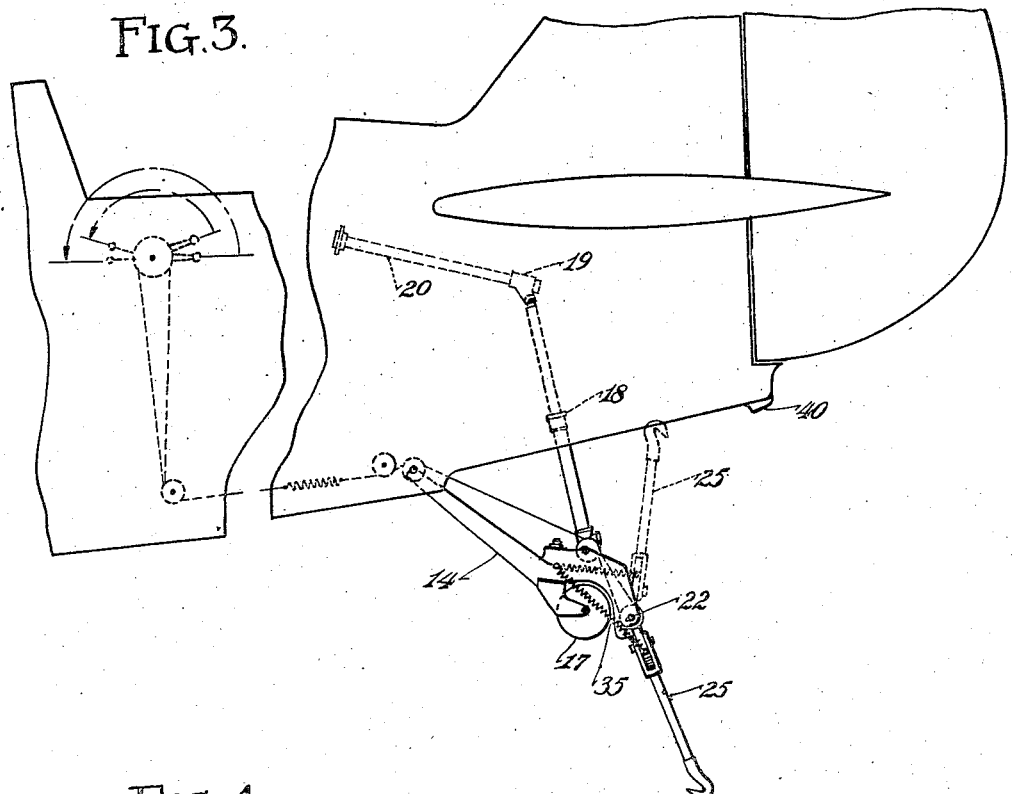
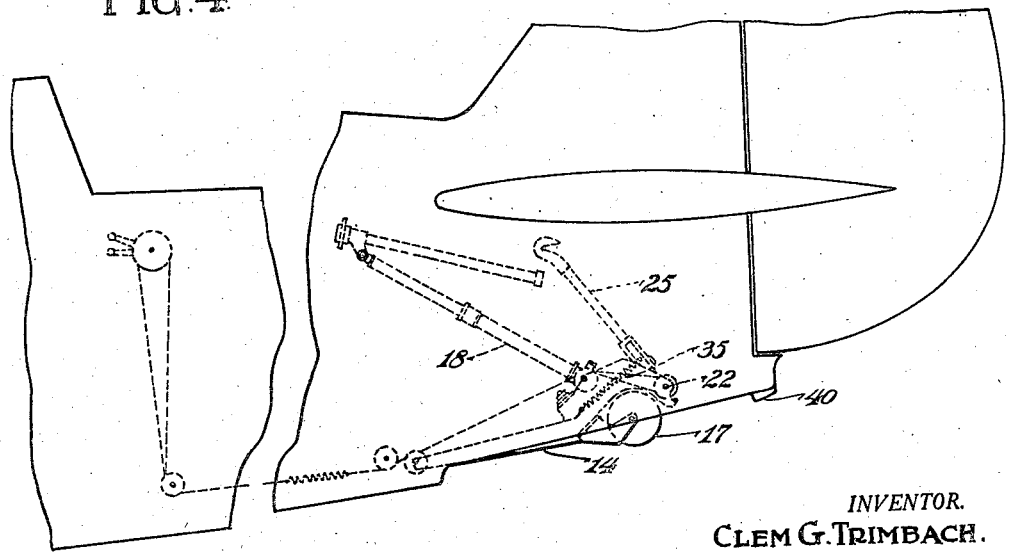

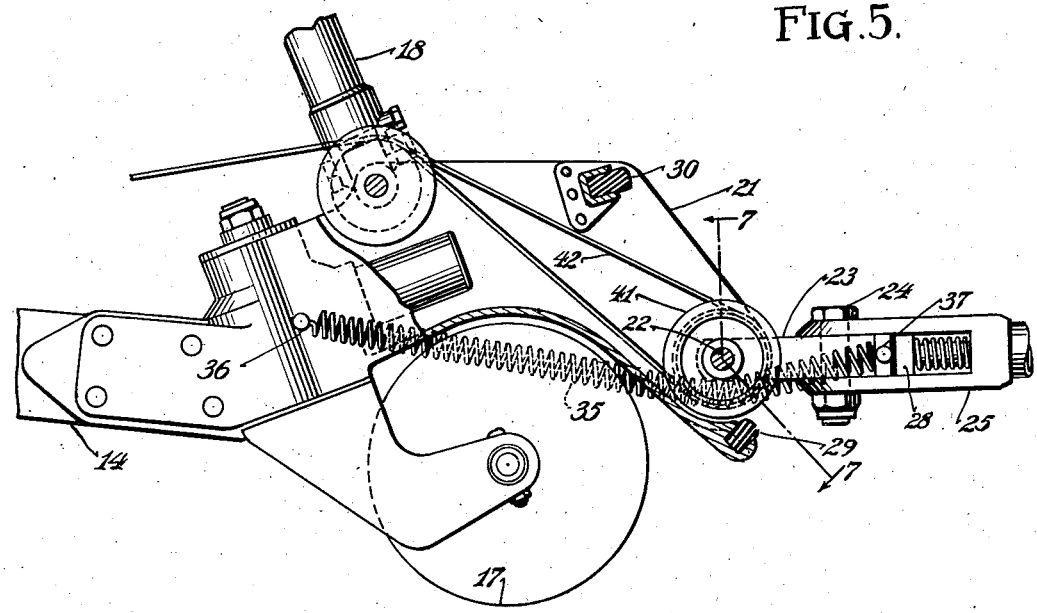
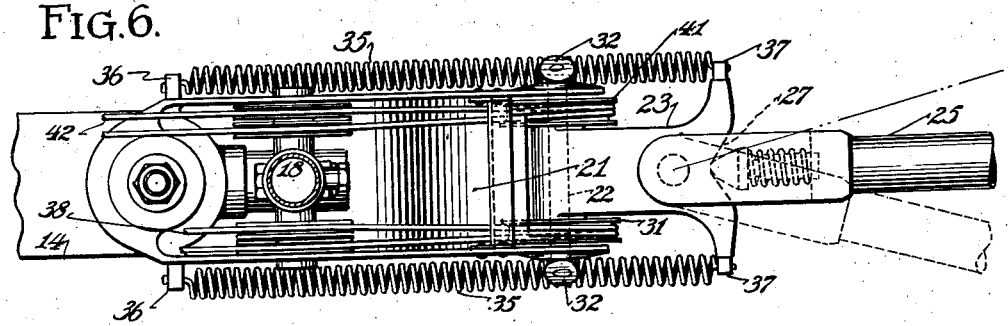
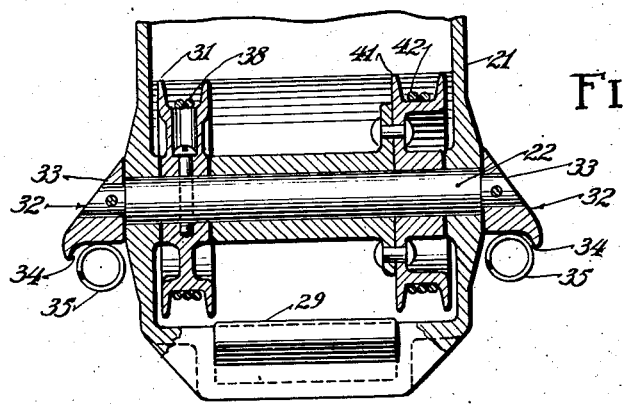

Patented Sept. 24, 1946

2,408,354

UNITED STATES PATENT OFFICE 2,408,354

ARRESTING GEAR

Clem G. Trimbach, Eggertsville, N. Y., assignor, by mesne assignments, to Curtiss-Wright Corporation, a corporation of New York Application March 28, 1936, Serial No. 71,415

10 Claims. (Cl. 244—110)

This invention relates to aircraft arresting gears, and is particularly concerned with improvements in the arresting hook organization now utilized on aircraft which are adapted to land on restricted landing surfaces, the arresting hook of such aircraft being adapted to engage suitable means adjacent the landing surface by which the aircraft may be quickly decelerated after ground contact is made.

It has been common in the past to provide an arresting shank having a ground engaging hook at the outer end thereof, pivoted to the aircraft so that it may be moved between extended and retracted positions. Such arresting hooks and shanks have in the past been independent units quite separate from the normal aircraft landing gear. In the present invention, I propose to attach the arresting hook directly to a more or less conventional tail wheel organization forming part of the normal aircraft landing gear. In so attaching the arresting hook to the tail wheel carrier, I provide means by which the arresting hook may be extended from the aircraft to a ground engaging position, and for retracting the hook wholly within the aircraft when the latter is in flight. The device of my invention may be conveniently utilized in connection with retractable tail wheel units. Additionally, I provide resilient means by which the landing hook may be maintained in contact with the landing surface after initial impact, and I further provide means for selectively disengaging the landing hook from the landing surface, so that it may lie in a semi-retracted position.

Objects of the invention are to provide an improved aircraft arresting gear; to provide an arresting hook organization cooperating with a normal aircraft landing gear; to provide selectively operable means for extending and retracting said arresting hook from and into the aircraft; to provide selectively operable resilient means for maintaining the arresting hook in contact with the landing surface after initial impact of the hook with said landing surface.

The detailed organization of the invention may be better understood by a reading of the annexed specification in connection with the drawings, in which:

Fig. 3 is an elevation, similar to Fig. 1, showing the tail wheel and arresting hook in extended position in preparation for landing;

Fig. 4 is an elevation similar to Fig. 1, showing the tail wheel and arresting hook completely retracted;

Fig. 5 is an enlarged elevation, partly in section, showing the tail wheel and arresting hook organization per se;

Fig. 6 is a plan of the elements shown in Fig. 5; and

Fig. 7 is a section on the line 7—7 of Fig. 5.

Figure 1:
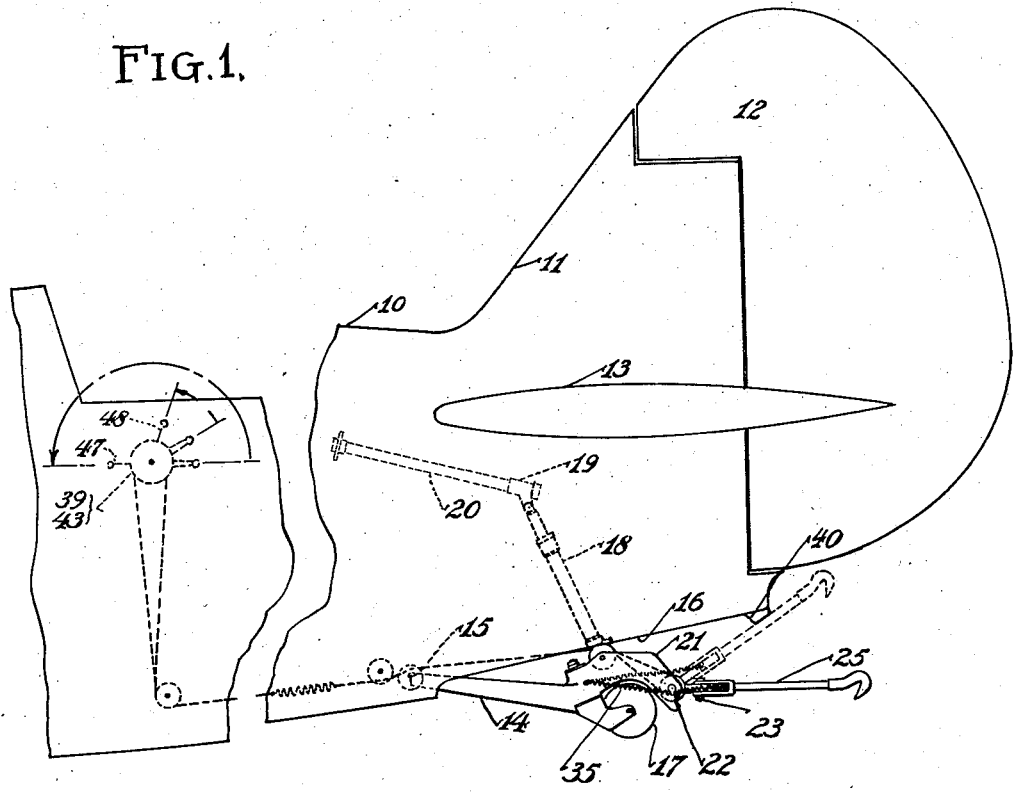
Fig. 1 is an elevation of the rearward part of an aircraft fuselage embodying a tail wheel and arresting hook according to this invention, the later being shown in ground contacting position.
Figure 2:
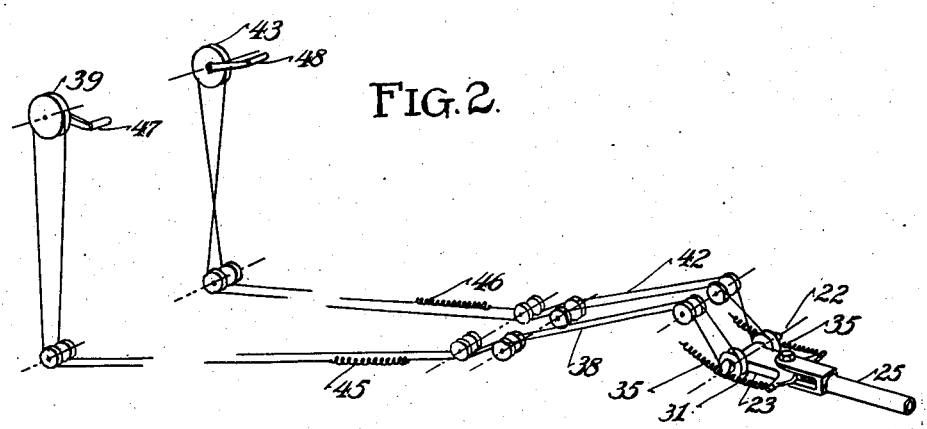
Fig. 2 is a diagrammatic view of the control connections for the arresting gear.

The aircraft fuselage 10, having the usual fin 11, rudder 12 and horizontal control surfaces 13, is provided with a tail wheel carriage 14 at the lower rearward end of the fuselage, said carriage being pivoted at 15 for vertical swinging, so that the carriage may be extended from or retracted within the tail portion of the aircraft. The fuselage covering is provided with a suitable opening indicated at 16 for reception of the tail wheel carriage when it is retracted. Said carriage is provided with a swiveling tail wheel 17 and is fitted with a compression shock absorber strut 18 having a nut 19 at its upper end, the nut engaging a screw shaft 20 which is turnable through suitable means (not shown) to move the nut forwardly or rearwardly therealong to effect, respectively, retraction and extension of the tail wheel carriage. The carriage 14 is extended rearwardly around the tail wheel 17, as at 21, and is provided with a transverse pivot 22 upon which a member 23 is pivoted for vertical swinging. Said member is provided with a vertical pivot 24 upon which is journaled a hook shank 25, the pivot 24 permitting of lateral movement of the hook shank, as shown in Fig. 6. The member 23 is notched as at 27, and a spring-pressed plunger 28, in the shank 25, bears within this notch to constantly urge the shank toward a central position with respect to the member 23. As shown in Fig. 5, a lower bumper 29 is provided to limit downward movement of the member 23, and an upper bumper 30 is provided on the extension 21 to limit the upward movement of the hook. The pivot 22, journaled in the extension 21, is provided with a pulley 31, as shown in Fig. 7, and the ends of the pivot 22 externally of the extension 21 are provided with lugs 32, each having a slanted upper face 33 and a hooked lower face 34. A spring 35 is provided on each side of the extension 21, the forward end of each spring being pivoted as at 36 to the tail wheel carrier 14, and the rearward end of each spring being pivoted as at 37 to the member 23. When the shank 25 is in a semi-retracted position such as is shown in Fig. 1, the springs 35 would normally tend to pass through the axis of the pivot 22. When the shank is tilted upwardly, the springs will lie above the pivot 22, as shown in Fig. 4, and when the shank is tilted downwardly, the springs will tend to lie below the pivot 22, as shown in solid lines in Fig. 3. Thus, when the springs are below the pivot, they will exert a force tending to pull the shank 25 down, and when they are above the pivot, they will exert a force tending to pull the shank up. The lugs 32 provided means for preventing movement of the springs above the axis of the pivot 22, since the springs will engage the lower hooked surfaces 34 of the lugs 32. The purpose of this is as follows.

Assuming the tail wheel carrier and the arresting hook shank to be in the fully extended position shown in Fig. 3, when the aircraft approaches the landing surface, the hook on the shank 25 will first strike the ground, tilting the shank upwardly, and tensioning the springs 35. Should the impact of the hook on the landing surface be severe, the hook might tend to bounce upwardly, in which case the springs 35 engage the lugs 32 and tend to return the shank 25 to a low position and to again contact the landing surface. Thereupon, the tail wheel contacts the landing surface, and the aircraft comes to rest with the shank 25 in the solid line position shown in Fig. 1. Presuming that the hook of the shank 25 has engaged a suitable arresting means on the landing surface, it is now desired to raise the hook out of contact with the landing surface, which is accomplished by turning the pivot 22 by means of the pulley 31 and a suitable control cable 38 extending over sheaves to a control drum 39 available to the pilot. Turning the pivot 22 tilts the lugs so that the springs disengage the lower hooked surfaces 34 thereof and the springs 35 snap over the inclined upper surfaces 33 of the lug to exert a force upon the shank 25 tending to pull the later upwardly to such a position as is shown by doted lines in Fig. 1. Here, an abutment 40 is provided at the tail of the fuselage upon which the shank 25 rests. The lugs 32 are then turned down to their original position.

The shank remains in this position of contact with the abutment 40 while the aircraft is on the ground, and incidentally, the hook may be used as a means for towing the airplane while on the ground. When the aircraft again takes off, the tail wheel strut 18, which has been compressed by the weight of the aircraft, extends to the position of Fig. 3, whereupon the shank 25 moves forwardly and upwardly to clear the abutment 40, and the shank is then pulled into the position shown by dotted lines in Fig. 3, by the springs 35. Thereupon, the tail wheel may be retracted by turning the screw 20, as above described, by which the shank 25 and the tail wheel unit as a whole, are withdrawn within the fuselage.

Now, when it is desired to again prepare the aircraft for landing, the tail wheel is lowered by turning the screw 20. If it is intended to land upon an unrestricted landing surface, the shank 25 may be permitted to remain in its elevated position, but if the landing is to be made on a restricted area equipped with arresting apparatus, it becomes necessary to swing the shank 25 downwardly into the solid line position of Fig. 3. This is accomplished by turning the element 23 downwardly, against the tension of the springs 35, said extension having a pulley 41 concentric with the pivot 22, and a cable 42 extending therearound, and over sheaves, to a control drum 43 turnable by the pilot. Upon turning the drum 43, the cable 42 will cause the shank 25 to swing downwardly. As the springs 35 become tensioned, and reach a position of alignment with the axis of the pivot 22, they will slip down over the inclined faces 33 of the lugs 32, to snap into position below the hooked faces 34 of said lugs, so that they may not again pass above the pivot axis until said lugs have been turned by the previously described means including the drum 39. Thereafter, the landing sequence, as previously described, is effected.

The cables 38 and 42 are provided with series springs 45 and 46, respectively, to permit of raising of the shank 25 on ground contact without causing a simultaneous alteration in the position of the control drums 39 and 43. These drums are respectively provided with hand cranks 47 and 48, and it will be seen in the various figures that forward movement of the handle 47 turns the lugs 32 to allow the springs 35 to snap thereabove, and forward turning of the handle 48 swings the shank 25 from a downwardly extending to an upward position. Rearward turning of the handles, respectively, resets the lugs 32 in the position shown in Fig. 7, and swings the shank 25 down, into landing position.

While I have described my invention in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. In an aircraft fuselage having an opening in the lower rearward surface thereof, a tail wheel chassis hinged to said fuselage and swingable vertically into and from said fuselage, means to swing said chassis, an arresting hook shank pivoted on said chassis and swingable with and with respect thereto, an abutment on said fuselage adjacent the rearward edge of said opening, and resilient means for urging said shank upward and into engagement with said abutment when said chassis is in an intermediate position of its swing, said shank being of such length that, when said chassis is in an extreme downward position, said shank clears said abutment and is swingable through said opening into said fuselage.

2. In aircraft, an arresting hook shank mounting, a pivot mounting said shank for vertical swinging, a resilient tension element attached at its ends to said shank and aircraft in such relation that said element intersects the axis of said pivot at substantially the position of midswing of said shank, whereby said element resiliently urges said shank up or down in accordance with the respective position of said element above or below said pivot, means for swinging said shank, and releasable latch means adjacent said pivot for holding said element below said pivot upon upward swinging of said shank.

3. The combination in aircraft of a tail wheel, a carrier therefor movably mounted in said aircraft, an arresting hook shank swingably mounted on said carrier for movement with and with respect thereto, and means for moving said shank vertically to selectively position the hook end of said shank either above or below said tail wheel.

4. In aircraft having a movable tail chassis and an arresting hook shank mounted for movement therewith and with respect thereto, said chassis being downwardly extendible upon relief of the aircraft weight therefrom, and means acting on said shank for urging same upwardly within said aircraft upon downward extension of said tail chassis.

5. In aircraft having a movable tail chassis and an arresting hook shank pivoted thereon, resilient means urging said hook downwardly about its pivot, manually operable means for moving said hook upwardly against said resilient means, and selectively operable means for rendering said resilient means inactive to urge said shank downwardly.

6. In aircraft, an arresting gear shank pivoted for rearward swinging between substantially vertical positions above and below said pivot, a landing gear carriage movable between elevated and lowered positions relative to said aircraft, journal means on said carriage carrying said shank pivot, and means for swinging said shank up or down when said carriage is in a lowered position.

7. In an aircraft fuselage, a tail wheel carrier hinged thereto and movable between retracted and extended positions, means for retracting and extending said carrier, an arresting hook shank pivoted to said carrier for vertical swinging, a spring pivoted at its ends to said carrier and shank and positioned to intersect the shank pivot axis when the shank is in a position of mid-swing, lying above and below said pivot, respectively, when said shank is above and below the mid-swing positions, and releasable catch means coaxial with the shank pivot for holding said spring from passing said pivot.

8. In an aircraft having a tail chassis retractable into the aircraft and extendible therefrom, means for retracting and extending said chassis, an arresting hook shank pivoted on said chassis and movable with and with respect thereto, resilient means urging said hook downwardly about its pivot, and manually operable means for moving said hook upwardly against said resilient means whereby said hook may be retracted into the aircraft with said chassis.

9. A landing gear for aircraft including a tail wheel unit pivotally mounted to the aircraft, an element transversely pivoted to said unit, an arresting hook vertically pivoted to said element, and resilient means connecting said unit and arresting hook for imparting movement to the hook independently of the movement imparted through said unit.

10. In an arresting gear for aircraft, a tail wheel unit pivotally mounted to the aircraft, an element pivoted to and movable with and independently of said unit, a hook swingedly carried by said element and normally maintained in alinement therewith, resilient means connecting the unit and element, means carried by the unit for restraining the resilient means to a downward force, and manual means for removing the restraining means whereby the resilient means will exert a force to move the unit to an upper position.

CLEM G. TRIMBACH.